UNITED STATES PATENT OFFICE.

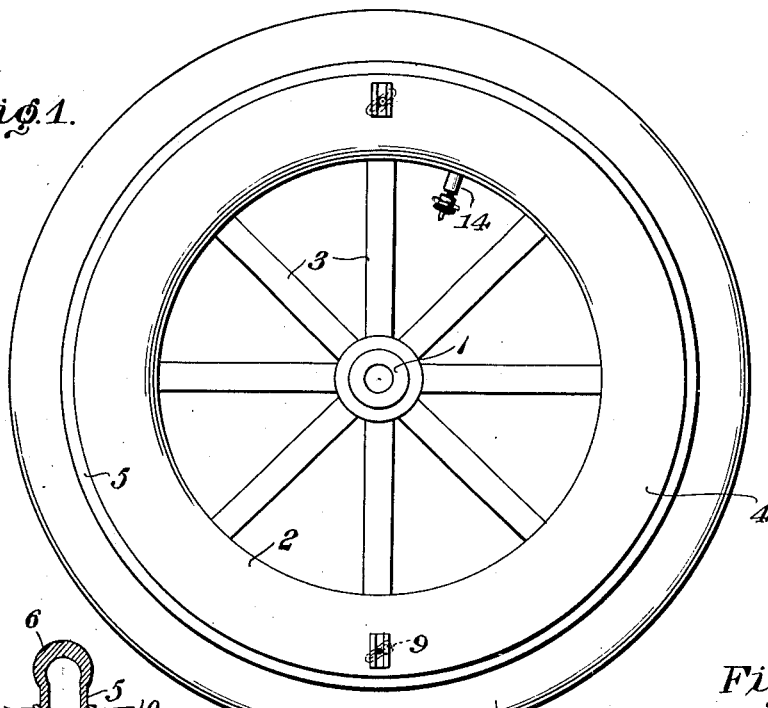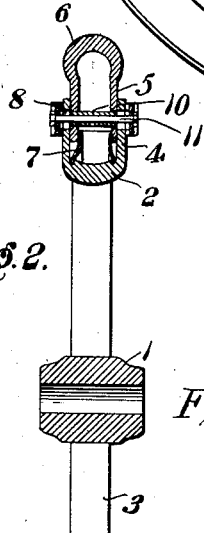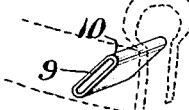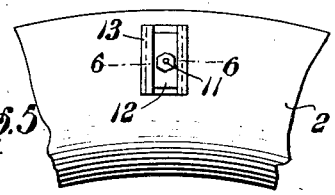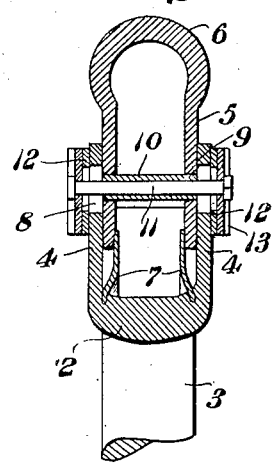

JOSEPH T. KENNELLY, OF RAWLINS, WYOMING.

PNEUMATIC TIRE.

No. 919,594.

Specification of Letters Patent.

Patented April 27, 1909.

Application filed June 2, 1908. Serial No. 436,206.

*To all whom it may concern:*

Be it known that I, JOSEPH T. KENNELLY, citizen of the United States, residing at Rawlins, in the county of Carbon and State of Wyoming, have invented certain new and useful Improvements in Pneumatic Tires, of which the following is a specification.

The present invention relates to an improved pneumatic tire embodying a novel construction whereby the desired resiliency may be obtained without the necessity of employing rubber or similar material which is objectionable owing to its more or less perishable nature.

The object of the invention is the provision of a device of this character in which the wheel rim and tire coöperate with each other to provide an air chamber, the said members having a sliding engagement with each other and novel means being provided for preventing relative rotation thereof.

For a full understanding of the invention and the merits thereof and also to acquire a knowledge of the details of construction and the means for effecting the result, reference is to be had to the following description and accompanying drawings, in which:

Figure 1 is a side elevation of a wheel provided with the improved pneumatic tire. Fig. 2 is a transverse sectional view through the same. Fig. 3 is an enlarged detail view of a portion of the tire. Fig. 4 is an enlarged sectional view through the tire and the rim of the wheel; Fig. 5 is an enlarged side elevation of a portion of the wheel rim; Fig. 6 is a sectional view on the line 6—6 of Fig. 5.

Corresponding and like parts are referred to in the following description and indicated in all the views of the drawings by the same reference characters.

Referring to the drawing, the numeral 1 designates the hub of a wheel, and 2 the rim which is connected to the hub by means of the spokes 3. This rim is provided upon opposite sides with the outwardly projecting spaced and parallel flanges 4. Loosely received between these flanges 4 are the lips 5 which project inwardly from the tire 6 which is preferably formed of metal. This tire 6 is hollow and is approximately circular in cross section, the inner portion of the tire being open and the lips 5 projecting from opposite sides of the said open portion. It will thus be obvious that the rim and the tire have a sliding connection with each other, and coöperate to provide an annular space within which it is designed to confine the air in such a manner as to provide a cushion for absorbing all shocks and jars and preventing the transmission of the same to the vehicle. A valve 14 of the conventional construction is provided for inflating the tire. For the purpose of preventing leakage of the air between the lips 5 of the tire and the flanges 4 of the rim, a pair of washers 7 are provided, the said washers being formed of some flexible material such as rubber, and having their inner edges secured to the rim adjacent the flanges, while their outer edges loosely overlap the lips 5 of the tire. The air confined within the tire will then tend to force the washers 7 against the lips 5 and flanges 4 so as to form an air-tight joint between the same and prevent leakage of the air from the interior of the tire.

The invention further contemplates the provision of novel means for preventing rotation of the tire 6 relative to the rim 2, and for this purpose, radial slots 8 are formed in the flanges 4 at diametrically opposite points, and the lips 5 of the tire are provided at corresponding points with slots 9 which are inclined at an angle of substantially 45° to the radius. Corresponding slots 9 upon the two lips 5 of the tire are connected by the flattened sleeves 10 which prevent the air confined within the tire from escaping through the slots. Bolts 11 pass loosely through the corresponding inclined slots 9 of the tire and radial slots 8 of the rim, and the ends of the bolts are received within slides 12 which are mounted within radially disposed guides 13 upon the exterior of the rim. With this construction, it will be obvious that while the tire and the rim are locked against relative rotation, nevertheless they are permitted to have a limited degree of radial and lateral movement, which is necessary in a device of this character.

Attention is directed to the fact that were the slots 9 arranged in a radial direction as well as the slots 8, the bolts 11 would defeat the purpose of the invention and lock the wheel and tire against relative vertical movement when the wheel had turned to throw the slots in a horizontal position. When the slots 9 are inclined however, the wheel is free to move up and down within the tire at any position of the slots, the inclination of the slots 9 merely serving to compound a slight lateral movement with the vertical movement.

Having thus described the invention, what is claimed as new is:

1. The combination of a rim provided with spaced flanges, the said flanges being formed with radial slots, a hollow tire provided with lips loosely received between the flanges and formed with inclined slots, and bolts passing through the corresponding slots in the tire and rim.

2. The combination of a rim provided with spaced flanges, a hollow tire formed with lips loosely received between the spaced flanges, the said lips being provided with corresponding slots which are connected by sleeves, and bolts passing loosely through the sleeves and having a sliding connection with the flanges of the rim.

3. The combination of a rim provided with spaced flanges, a hollow tire formed with lips loosely received between the spaced flanges, the said lips being formed with corresponding slots which are connected by flattened sleeves, and bolts passing loosely through the flattened sleeves and having a sliding connection with the flanges of the rim.

4. The combination of a rim provided with spaced flanges having radial slots therein, a tire formed with lips loosely received between the spaced flanges, the said lips being provided with corresponding inclined slots connected by flattened sleeves, and bolts passing loosely through the flattened sleeves and engaging the radial slots of the flanges upon the rim.

5. The combination of a rim provided with spaced flanges, radial guide ways upon the spaced flanges, a tire formed with lips loosely received between the spaced flanges, the said lips being provided with inclined slots connected by flattened sleeves, bolts passing loosely through the flattened sleeves, and slides engaging the extremities of the bolts and mounted upon the radial guide ways of the flanges of the rim.

6. The combination of a rim provided with spaced flanges having radial slots formed therein, radial guide ways upon the flanges, slides mounted upon the radial guide ways, a tire formed with lips loosely received between the flanges, the said lips being provided with corresponding inclined slots connected by flattened sleeves, and bolts passing loosely through the flattened sleeves and also through the radial slots of the flanges, the said bolts being engaged by the before mentioned slides.

In testimony whereof I affix my signature in presence of two witnesses.

JOSEPH T. KENNELLY. [L. S.]

Witnesses:
MARY A. KENNELLY,
Mrs. A. KENNELLY.